United States Patent [19]

Butler

[11] Patent Number: 5,979,106
[45] Date of Patent: Nov. 9, 1999

[54] LIVE EEL FISH BAIT DEVICE

[76] Inventor: Bradford T. Butler, 8 Victoria Rd., East Harwich, Mass. 02645

[21] Appl. No.: 09/046,355

[22] Filed: Mar. 23, 1998

[51] Int. Cl.[6] .......................... A01M 23/34; A01K 97/14; A01K 15/04
[52] U.S. Cl. ............................... 43/87; 119/804; 119/803; 43/5
[58] Field of Search ................... 43/1, 4, 5, 87; 119/801, 802, 803, 804

[56] References Cited

U.S. PATENT DOCUMENTS

| | | | |
|---|---|---|---|
| 235,675 | 12/1880 | Ewing | 119/803 |
| 511,148 | 12/1893 | Jones | 119/804 |
| 647,563 | 4/1900 | Gasser | 119/803 |
| 745,323 | 12/1903 | Carns | 119/802 |
| 949,900 | 2/1910 | Jackson | 269/3 |
| 999,840 | 8/1911 | Nelson | 119/804 |
| 1,382,520 | 6/1921 | Lundene | 119/804 |
| 1,540,640 | 6/1925 | Lewis | 43/87 |
| 1,732,919 | 10/1929 | Thompson | 43/87 |
| 2,071,453 | 2/1937 | Burns | 43/87 |
| 2,499,511 | 3/1950 | Koger | 119/803 |
| 2,616,123 | 11/1952 | Armstrong | 452/63 |
| 2,627,137 | 2/1953 | Koski | 43/87 |
| 2,704,052 | 3/1955 | Wood | 119/804 |
| 3,209,395 | 10/1965 | Jones et al. | 452/128 |
| 3,224,404 | 12/1965 | De Jong | 114/230 |
| 3,287,845 | 11/1966 | Smith | 43/53.5 |
| 3,319,609 | 5/1967 | Pickard et al. | 119/804 |
| 3,402,959 | 9/1968 | Harris | 294/19.1 |
| 3,540,769 | 11/1970 | Rosser | 294/19 |
| 3,677,597 | 7/1972 | Stipek | 294/19 R |
| 3,765,119 | 10/1973 | Hare et al. | 43/87 |
| 3,841,685 | 10/1974 | Kolodziej | 294/19 R |
| 3,872,616 | 3/1975 | Poland | 43/5 |
| 3,949,514 | 4/1976 | Ramsey | 43/87 |
| 3,967,408 | 7/1976 | Aberg | 43/87 |
| 4,083,142 | 4/1978 | Gregerson | 43/87 |
| 4,179,837 | 12/1979 | Gummeringer | 43/87 |
| 4,250,653 | 2/1981 | Davies | 43/87 |
| 4,261,280 | 4/1981 | Collic, Sr. | 114/221 R |
| 4,513,527 | 4/1985 | Wicklund | 43/87 |
| 4,599,074 | 7/1986 | Beckly | 441/80 |
| 4,761,911 | 8/1988 | Butera | 43/87 |
| 5,088,449 | 2/1992 | Lamb, Sr. et al. | 119/153 |
| 5,282,825 | 2/1994 | Muck et al. | 606/203 |
| 5,699,748 | 12/1997 | Linskey, Jr. et al. | 114/221 R |
| 5,752,731 | 5/1998 | Crone | 294/24 |
| 5,832,651 | 11/1998 | Arntz | 43/5 |

FOREIGN PATENT DOCUMENTS

| | | | |
|---|---|---|---|
| 2555020 | 5/1985 | France | 119/803 |
| 498945 | 1/1976 | U.S.S.R. | 119/803 |
| 686705 | 9/1979 | U.S.S.R. | 43/87 |
| 878735 | 10/1961 | United Kingdom | 119/803 |

*Primary Examiner*—Michael J. Carone
*Assistant Examiner*—Fredrick T. French, III
*Attorney, Agent, or Firm*—Thomas A. Kahrl

[57] ABSTRACT

A bait loading arrangement including a yoke member in which an extensible loop is drawn tightly over the head end of a bait fish consisting of an eel that is being held in a bait container to enclose the neck of an eel to effectively provide for immobilizing the bait fish, typically by remotely holding the bait by a yoke member to allow the handler to manipulate the eel for loading onto a conventional curved barb fish hook, thereafter to be released, all without manually handling the slimy skin of the eel.

4 Claims, 4 Drawing Sheets

LIVE EEL FISH BAIT DEVICE

BACKGROUND OF THE INVENTION

1. Field of the Invention (Technical Field)

The present invention relates to live bait apparatus having an extensible loop device. More specifically the present invention is directed to the inventive combination of a bait loading arrangement in which an extensible loop is drawn tightly over the head end of an eel that is being held in a bait container. The loop draws close to the handle to allow the handle to manipulate the eel for loading onto a conventional curved barb fish hook, thereafter to be released, all without manually handling the slippery skin of the eel.

2. Background Prior Art

Applicant is aware of prior loop arrangements. For example U.S. Pat. No. 3,949,514 to Ramsey shows a rounded head section 15, FIG. 1, having curved surfaces that are pressed against the body of an animal. A snake is shown in the drawing.

U.S. Pat. No. 2,704,052 to Wood shows a cable 12, FIG. 1, that has a free end which is used to manually tighten a loop 11. (A locking mechanism having a ball ramp arrangement locks the cable into a desired position.)

U.S. Pat. No. 3,967,408 to Aberg shows an animal trap comprising a tubular body with a protective material casing having a spring located in the body which is attached to a snare located outside of the body. The contraction of the spring is controlled by a trap setting mechanism including a release arm and the spring is released to contract and move the snare towards the body when the animal treads on the release arm.

U.S. Pat. No. 2,616,123 to Armstrong shows an elongated barrel, a plunger reciprocally mounted in said barrel, a handle affixed to said plunger at its outer end, said barrel having a lateral opening adjacent its inner end, a plate having a pair of outwardly extending diametrically opposed ears affixed to and surrounding the barrel adjacent the inner end thereof, a bracket removably attached to said ears and having a slot centrally disposed therein, a blade affixed to said bracket and extending outwardly in the same direction as the longitudinal axes of said barrel and said plunger, a snare loop extending through the lateral opening in the barrel and having a stop head outwardly of said opening and attached at its other end to the inner end of said plunger, said loop adapted to extend through said slot in said bracket in parallel relation and adjacent to said blade when the same is affixed to said plate, and a latch for maintaining said plunger in selected positions relative to said barrel.

U.S. Pat. No. 4,250,653 to Davies shows a humane animal trap having a snare with a formed loop having ends which pass through a hollow telescoping system. The telescoping means is comprised of a main barrel connected to the loop, a slave barrel within the main barrel, and a working barrel within the slave barrel. The barrels are biased in an extended position by a spring which is connected between the main barrel and working barrel. A trigger prevents extension of the barrels and is selectively held in position by a trip.

U.S. Pat. No. 3,765,119 to Hare et al. shows a snare comprised of an elongated two-part stiff shank or stem member to be manually grasped single-handedly at the proximate end and having a flexible extension portion at the distal end. A traveler member carrying latch means slides along the stiff portion between the distal end and the handle portion. At the extreme or outer end of the flexible portion is a snaring strand having a ring-like member adapted to encircle and slidably move along both the flexible and rigid portions of the snare. The ring-like member may engage and be retained by the latch means on the traveler member. When the flexible snaring strand is tensed as when the ring-like member is drawn toward the proximate end of the shank or stem portion, the flexible portion of the shank is bowed and energy is stored to be employed when a snaring operation is to be performed. When the ring-like member is released or and cast outward and around an object such as a fish or snake or animal about which the snare is placed.

U.S. Pat. No. 3,402,959 to Harris discloses a snare for attachment to a floating object, such as a torpedo, comprising a cable loop urged toward closed position by an extensible spring, and a removable pole having abutments for retaining the spring compressed until the loop is disposed around the object.

U.S. Pat. No. 4,513,527 to Wicklund discloses an animal trap and ball detent trigger means. The trap is of shaft and block construction with the cable carrying block spring biased toward one end of the shaft. The plunger and a trigger member are spring biased in a home set position. The disturbance of the trigger member from its home position causes the trigger to rock in its conical recess and thereby apply a reciprocating lateral force to the plunger releasing the detaining force of the balls from the cable block.

A review of the prior art indicates use of spring loading or loops that tighten onto the loop itself. Contrary to the teachings of the prior art, all of which rely on mechanical biasing which could be harmful to bait fish by crushing their necks, the current invention avoids spring loading and its tendency to apply too much pressure onto the eel used as the live bait.

A common problem of fishing with live bait is immobilizing the bait fish, typically by physically holding the bait by hand, while loading it on a barbed hook. This problem becomes acute when using a live eel, typically having a length of 6" to 8", as bait, due to the slimy film typically encountered on its skin. This slimy film renders it often nearly impossible to immobilize the eel by hand, not to mention the unpleasant aspect of grappling with a wriggling eel. Notwithstanding this, eels have long been prized as bait, particularly for large striped bass. The problem with using eels for bait is that, in their natural condition, their skin is coated with slime, permitting them to wiggle free from most attempts to hold them for baiting a hook. Not only is it difficult to handle them, but for many fishermen and particularly fisher women, it is also repulsive. To many fishermen, the prospect of grappling with a slimy serpentine eel is decidedly unpleasant, so much so that too often an artificial eel is employed for the ease of use, with the result that no fish is caught.

Accordingly, there is a need in the live bait art for a new and improved arrangement for live bait loading in which an extensible loop is drawn tightly over the head end of a bait fish to provide for immobilizing the bait fish, typically by remotely holding the bait by a yoke member, while loading it on a barbed hook, which overcomes at least some of the disadvantages of prior art.

SUMMARY OF THE INVENTION

The present invention relates to live bait apparatus having an extensible loop device. More specifically the present invention is directed to the inventive combination of a bait loading arrangement including a yoke member in which an extensible loop is drawn tightly over the head end of an eel that is being held in a bait container. The loop draws close to the handle to enclose the neck of an eel to effectively provide for immobilizing the bait fish, typically by remotely holding the bait by a yoke member to allow the handler to manipulate the eel for loading onto a conventional curved barb fish hook, thereafter to be released, all without manually handling the slimy skin of the eel.

Critical features of the present invention include the following;

a) frictional association between the strand member and the yoke handle for controlled biasing of the loop permitting b) a first one-handed immobilization operation, which can be employed to hold the yoke handle, size the extendible loop for the selected bait fish, engage the head of the bait fish, and retract the loop member to harness the head of the eel with loop encircling the neck of the eel for immobilizing it such that c) a second one-handed operation is permitted, which can be employed to manipulate a barbed hook member for forcing the barb through the lip portion of the eel; and d) a close association of the yoke handle to control handle, which is critical to permit the one-handed first operation and should permit portions of each handle to fit in the palm of the handler's hand.

It is a general object of the present invention to provide a live eel bait loading device for loading said eel on to a conventional curved barbed fish hook.

More particularly, it is an object of the invention to provide a bait loader configured for one handed operation which holds the head of an eel used for bait substantially immovable.

Another object of the invention is to provide a bait loading device having a floatation compartment for providing flotation if dropped overboard.

A further object is to provide a moveable handle for controlling the movements of the bait.

Yet another object of the invention is to prevent removal of a live eel's protective coating of slime during handling.

A further object of the invention is to provide a system and method for loading a live eel on a barbed hook in a fast efficient manner.

These and other objects, advantages, and features of the invention will be apparent from the following description of preferred embodiments considered along with the accompanying drawings. The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

The accompanying drawings, which are incorporated into and form a part of the specification, illustrate several embodiments of the present invention and together with the description serve to explain the principals of the invention. The drawings are only for the purpose of illustrating a preferred embodiment of the invention and are not construed as limiting the invention.

DETAILED DESCRIPTION OF THE PREFERRED EMBODIMENT

Figure 1:
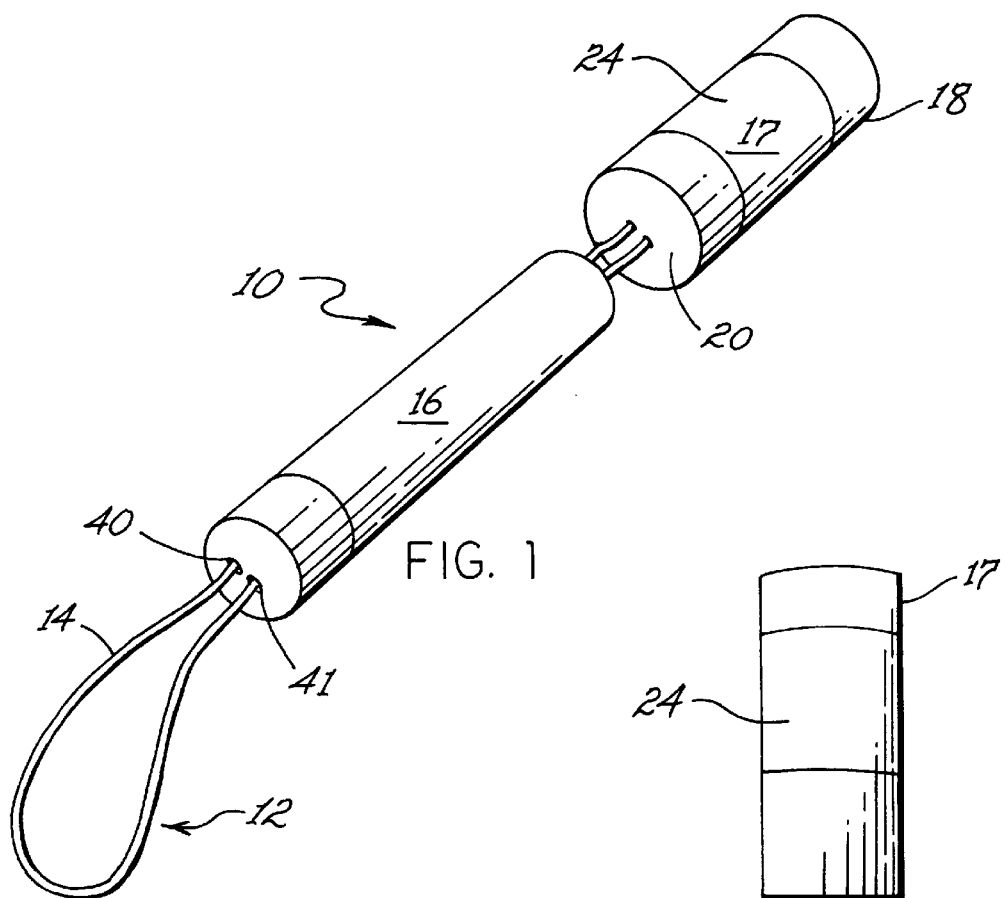
FIG. 1 is a perspective view of the bait loading device of the present invention showing the extensible loop in an extended position.
Figure 2:
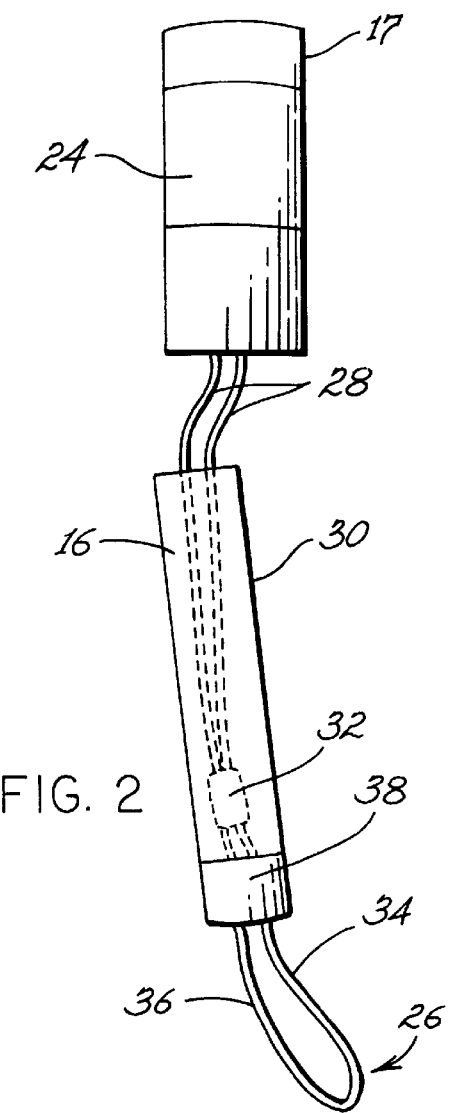
FIG. 2 is a side view of the bait loading device of FIG. 1 showing the crimp apparatus attached to the strand of monofilament in dotted lines.
Figure 3:
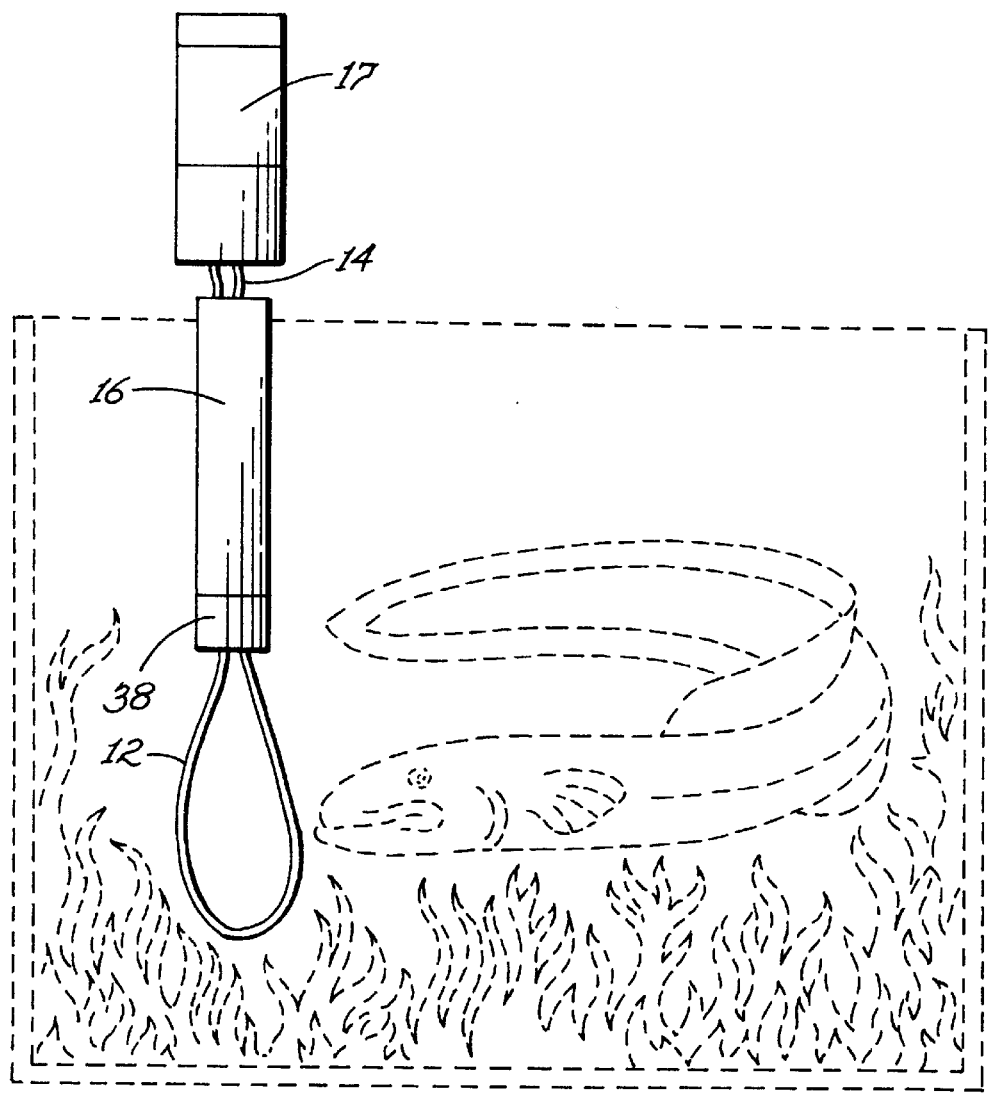
FIG. 3 is a perspective view of the bait loading device of FIG. 1 showing the loop member adjacent the head of a bait fish, particularly an eel.
Figure 4:
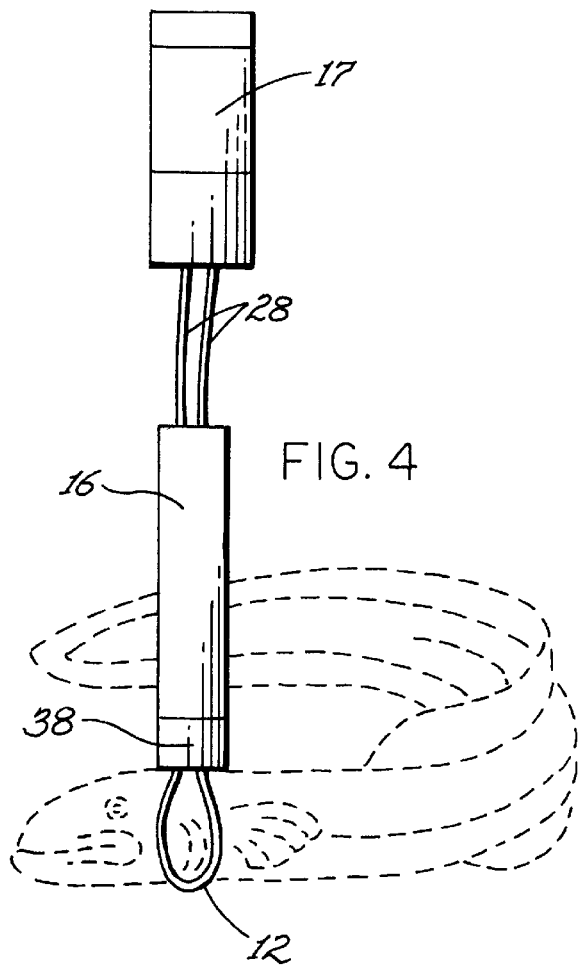
FIG. 4 is a perspective view of the bait loading device of FIG. 1 showing the loop device engaging the head of an eel.
Figure 5:
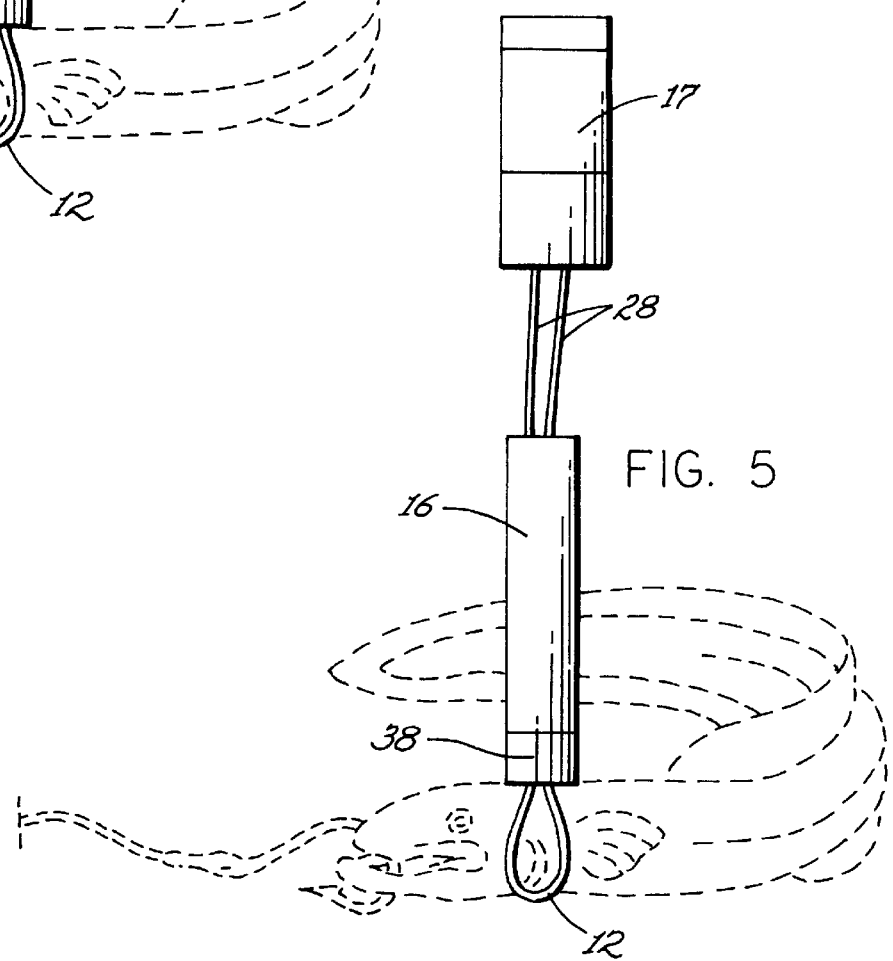
FIG. 5 is a perspective view of the bait loading device of FIG. 1 showing the loop device engaging the head of an eel with a hook affixed thereto.
Figure 6:
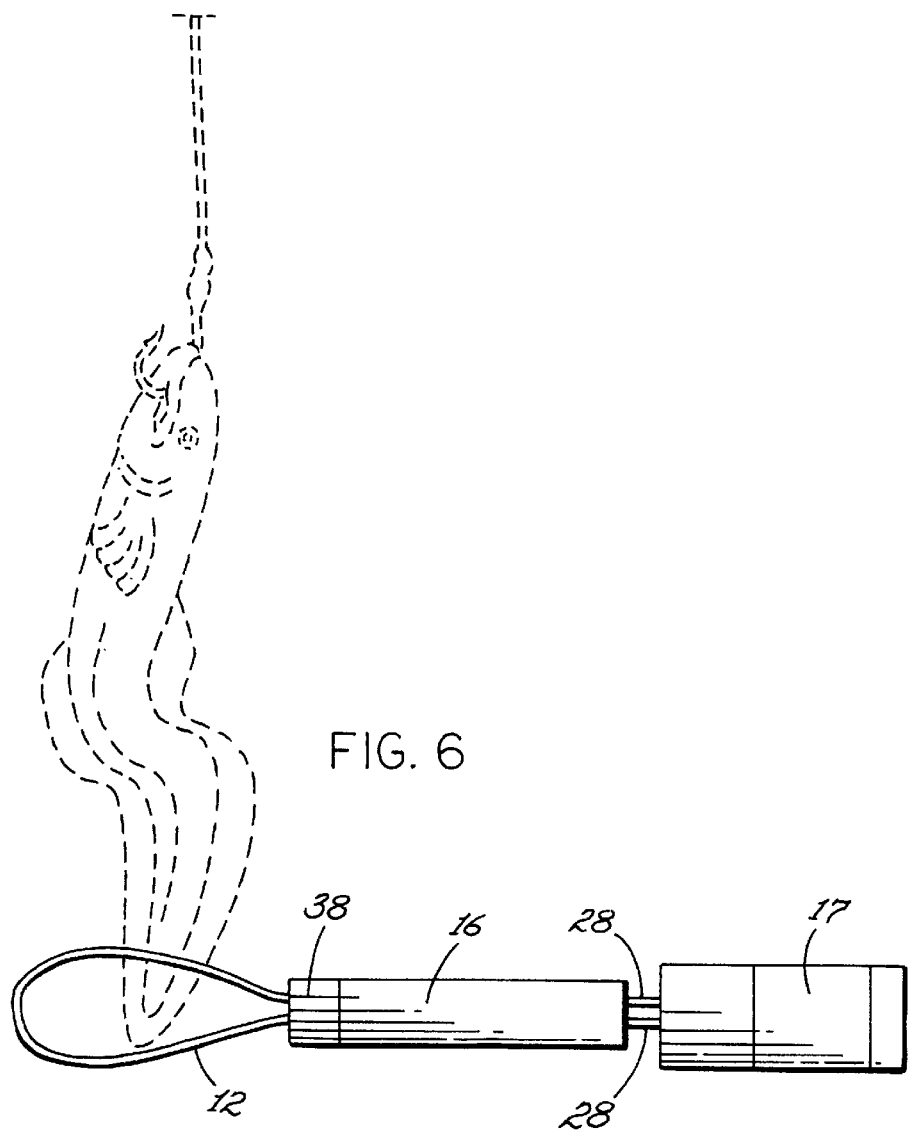
FIG. 6 is a perspective view of the bait loading device of FIG. 1 showing an eel being released from the bait loading device.

Referring to FIGS. 1–6, the preferred embodiment is directed to a live bait loading arrangement 10 having an extensible loop member 12 comprising a monofilament strand 14, which passes through a yoke 16, connected to a control body 17. Referring to FIGS. 1 & 2 there is shown the preferred embodiment wherein the control body 17 comprises a cylindrical handle 18 having a face plate 20 having a central bore 22 and a central flotation chamber 24. As is shown in FIGS. 4 and 5 extensible loop 12 is configured to be drawn tightly over the head end of a bait fish comprising an eel shown in dotted lines.

As is shown in FIG. 2, the extensible loop member 12 comprises a strand of resilient plastic monofilament 14 formed in an elongated u-shape, having a loop member 26 at a distal end and a pair of legs 28 extending away from said loop. Said legs 28 pass through tubular body 30 and terminate at face plate 20 of control body 17 being attached thereto. A crimp fastener 32 is provided, as is shown in dotted lines in FIG. 2, for fastening said strand 14 means together for forming said extensible loop member having a first arc 34 and second arc 36.

Referring to FIGS. 1 & 2, yoke 16 includes a yoke cap 38 attached at the distal end a tubular body 30 positioned adjacent loop 26; said cap having a pair of orifices comprising a first orifice 40 that frictionally associates with the first arc 34 and a second orifice 41 that frictionally associates with the second arc 36; wherein loop 26 adjustably extends through yoke 16. For operation, control body 17 is selectively manually biased for movement toward and away from yoke 16 for manipulation of said extensible loop member 12 such that it is successively drawn tightly over the head end of a bait fish, held tightly to hold the fish relatively for affixing a hook for baiting and then loosened to release the bait fish.

Figure 7:
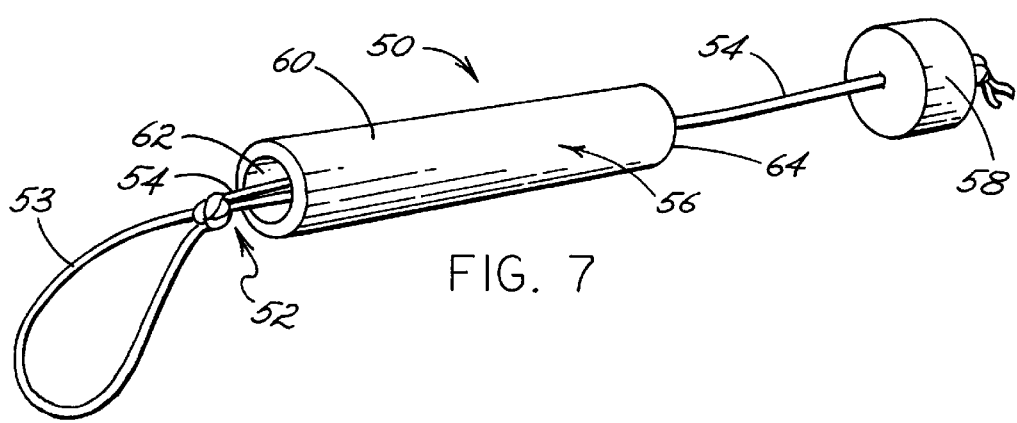
FIG. 7 is a perspective view of an alternate embodiment of the bait loading device of the present invention showing the extensible loop in an extended position.

Referring to FIGS. 7, the alternate embodiment comprises a live bait loading arrangement 50 having an extensible loop member 52 comprising a monofilament strand 54, which passes through a yoke 56, connected to a control handle 58. The yoke 56 has a tubular body 60 having a lower open end 62 and an upper open end 64 positioned adjacent said control handle 58. The extensible loop member 52 includes a fixed loop 53 positioned at one end of resilient strand member 54. The other end of said resilient strand member 54 terminates at said control handle 58. The operation of the alternated embodiment is substantially similar to that of the preferred embodiment shown in FIGS. 4 and 5 wherein the extensible loop 12 is configured to be drawn tightly over the head end of a bait fish comprising an eel shown in dotted lines.

The preferred embodiment further comprises a live bait loading process comprising baiting an eel by means of articulating a bait loading device 10; comprising the steps of a) providing the live bait loading arrangement 10 wherein an extensible loop is drawn tightly over the head end of a bait fish comprising b) providing frictional association between the strand member and the yoke handle permitting a first one-handed immobilization operation, to hold the yoke handle, size the extensible loop for the selected bait fish, and retract the loop member to harness the head of the eel with loop encircling the neck of the eel for immobilizing it such that c) a second one-handed operation can be employed to manipulate a barbed hook member for forcing the barb through the lip portion of the eel wherein the relationship of yoke handle to control handle is critical to permit the one-handed first operation and should permit portions of each handle to fit in the palm of the handler's hand.

Furthermore said first one-handed operation provides for a) remotely catching a live eel in a live-bait container which consists of manipulating said extensible loop member which can be drawn tight in noose-like fashion to hold the eel, b) remotely picking up the eel from said container without manually handling the slimy skin of said eel c) holding the eel in an said container without manually handling the slimy skin of said eel c) holding the eel in an assessable position suitable for affixing a hook to said eel for the baiting of the hook and d) releasing the combination hook and live eel attached thereto all without manually handling the eel.

What is claimed is:

1. A live bait loading arrangement in which an extensible loop is drawn tightly over a head end of a bait fish comprising,
    a control body member comprising a cylindrical handle having a face plate and a central floatation chamber;
    an extensible loop comprising a strand of monofilament formed in an elongated u-shape, said extensible loop having a loop member, being formed of a first arc and a second arc, at a distal end and a pair of legs extending away from said loop member to pass through a tubular body member of a yoke,
    said loop member being movable between a first extended position for passing over a head end of a bait fish and a second bait engaging position for engaging said head end of the bait fish;
    means for fastening said strand together comprising a crimping means for forming said loop member by doubling over said strand and fastening the pair of legs together;
    said yoke comprising;
        a tubular body member having a distal end positioned adjacent said loop member and having a frictional association with said strand wherein said pair of legs movably extend through said yoke,
        a yoke cap attached at the distal end of said tubular body member;
        said yoke cap having a pair of orifices, said orifices generally conforming to the size and shape of the strand of monofilament and wherein a first orifice frictionally associates with said first arc and a second orifice frictionally associates with said second arc;
    wherein said loop member adjustably extends through said yoke cap, and
    whereby the control body member is selectively manually biased for movement toward and away from said yoke for manipulation of the extensible loop such that said loop member is successively,
        a) drawn from the first extended position over the head end of the bait fish to the second bait engaging position wherein the head of the bait fish is drawn against said yoke,
        b) holding said bait fish tightly against said yoke with said loop member in a relatively immobile position for affixing a hook for baiting, and
        c) thereafter returning said loop member to said first extended position for releasing said bait fish.

2. The live bait loading arrangement of claim 1 wherein the control body member comprises a cylindrical handle constructed of flotation material having a central flotation chamber for storing articles.

3. The live bait loading arrangement of claim 1 wherein said control member comprises a cylindrical flotation device having a shape matching that of the yoke for ease of gripping one-handed.

4. A live eel fish baiting device comprising;
    a control body member comprising a cylindrical handle having a face plate and a central floatation chamber;
    an extensible loop comprising a strand of resilient plastic monofilament formed in an elongated u-shape,
    said extensible loop having a loop member being formed of a first arc and a second arc at a distal end and a pair of legs extending away from said loop member to pass through a tubular body member of a yoke,
    means for fastening said strand together for forming said loop member comprises a crimping device;
    said yoke comprising a yoke cap attached to one end of a tubular body member positioned adjacent said loop member;
    said yoke cap having a pair of orifices, said orifices generally conforming to the size and shape of the strand of monofilament and wherein a first orifice frictionally associates with said first arc and a second orifice frictionally associates with said second arc;
    wherein said loop member adjustably extends through the yoke,
    wherein said control body member is selectively manually biased for movement toward and away from the yoke for manipulation of said extensible loop wherein said loop member is selectively drawn tightly over a head of a bait fish;
    holding said bait fish relatively immobile for affixing a hook for baiting, and thereafter releasing said bait fish.

* * * * *